US 9,140,313 B2

(12) United States Patent
Ikegawa

(10) Patent No.: US 9,140,313 B2
(45) Date of Patent: *Sep. 22, 2015

(54) ELECTROMAGNETIC CLUTCH

(75) Inventor: Atsutoshi Ikegawa, Paris (FR)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 97 days.

This patent is subject to a terminal disclaimer.

(21) Appl. No.: 14/003,194

(22) PCT Filed: Apr. 10, 2012

(86) PCT No.: PCT/JP2012/059787
§ 371 (c)(1),
(2), (4) Date: Sep. 4, 2013

(87) PCT Pub. No.: WO2012/147509
PCT Pub. Date: Nov. 1, 2012

(65) Prior Publication Data
US 2013/0341151 A1    Dec. 26, 2013

(30) Foreign Application Priority Data

Apr. 27, 2011 (JP) ................................. 2011-099898
Nov. 9, 2011 (JP) ................................. 2011-245823

(51) Int. Cl.
*F16D 27/105* (2006.01)
*F16D 27/00* (2006.01)

(52) U.S. Cl.
CPC ........ *F16D 27/105* (2013.01); *F16D 2027/007* (2013.01)

(58) Field of Classification Search
CPC .................................................... F16D 27/105
USPC ...................................................... 192/84.81
See application file for complete search history.

(56) References Cited

U.S. PATENT DOCUMENTS 5,031,744 A    7/1991    Nishimura
5,967,274 A    10/1999   Leone et al.
(Continued)

FOREIGN PATENT DOCUMENTS

CN    101140017 A    3/2008
CN    201428759 Y    3/2010
(Continued)

OTHER PUBLICATIONS

International Search Report (PCT/ISA/210) mailed on Jul. 17, 2012, by the Japanese Patent Office as the International Searching Authority for International Application No. PCT/JP2012/059787.
(Continued)

*Primary Examiner* — Richard Lorence
(74) *Attorney, Agent, or Firm* — Buchanan Ingersoll & Rooney PC

(57) ABSTRACT

A compact-size electromagnetic clutch reaches a blocking state as an electromagnetic solenoid is switched from a non-driving state to a driving state and can save wasteful consumption of energy under this blocking state. This electromagnetic clutch includes a wrap spring in pressure-contact with an outer face of a cylindrical portion of a drive pulley provided on the center side thereof. One end of the wrap spring is coupled to a drive arm of a drive member operably connected to a shaft. The other end of the wrap spring is coupled to an operational member rotatable relative to the shaft and movable along the rotational axis thereof. An electromagnetic solenoid attracts the operational member. An operational mechanism permits realization of the blocking state by preventing rotation of the drive member after a twisting operation of the wrap spring subsequent to the attraction of the operational member by this electromagnetic solenoid.

11 Claims, 8 Drawing Sheets

(56) References Cited

U.S. PATENT DOCUMENTS

| | | | |
|---|---|---|---|
| 8,545,191 B2 * | 10/2013 | Ikegawa et al. | 417/223 |
| 2002/0065171 A1 | 5/2002 | Raber | |
| 2005/0045445 A1 | 3/2005 | Van Heteren et al. | |
| 2008/0041686 A1 | 2/2008 | Hoshino et al. | |
| 2009/0039136 A1 | 2/2009 | Tanimoto et al. | |
| 2011/0236230 A1 | 9/2011 | Ikegawa et al. | |
| 2013/0112523 A1 * | 5/2013 | Ikegawa | 192/74 |
| 2013/0341150 A1 * | 12/2013 | Ikegawa | 192/80 |

FOREIGN PATENT DOCUMENTS

| | | |
|---|---|---|
| JP | 58-134235 A | 8/1983 |
| JP | S60-220228 A | 11/1985 |
| JP | 3-129130 A | 6/1991 |
| JP | 3-48421 Y2 | 10/1991 |
| JP | 11-201191 A | 7/1999 |
| JP | 2001-317565 A | 11/2001 |
| JP | 2007-118170 A | 5/2007 |
| WO | WO 2010/054487 A1 | 5/2010 |

OTHER PUBLICATIONS

Written Opinion (PCT/ISA/237) mailed on Jul. 17, 2012, by the Japanese Patent Office as the International Searching Authority for International Application No. PCT/JP2012/059787.

Japanese Office Action for JP 2011-244749 dated Jul. 9, 2012.

Notification of Transmittal of Translation of the International Preliminary Report on Patentability (Forms PCT/IB/338 and PCT/IB/373) and the Written Opinion of the International Searching Authority (Form PCT/ISA/237) issued on Nov. 7, 2013, by the International Bureau of WIPO in corresponding International Application No. PCT/JP2012/059787. (6 pages).

Office Action issued on Apr. 3, 2015, by the Chinese Patent Office in corresponding Chinese Patent Application No. 201280010378.9. (6 pages).

Extended European Search Report issued on Jun. 15, 2015, by the European Patent Office in corresponding European Application No. 12777143.4. (6 pages).

* cited by examiner

ELECTROMAGNETIC CLUTCH

TECHNICAL FIELD

The present invention relates to an electromagnetic clutch, more particularly to an electromagnetic clutch including a drive pulley and a shaft mounted coaxially, and a wrap spring in the form of a coil extending about a rotational axis, the clutch coupling/blocking transmission of a force by changing the coil diameter of the wrap spring.

BACKGROUND ART

As an arrangement similar to the electromagnetic clutch configured as above, PTL 1 discloses an arrangement wherein an input hub and an output hub are disposed in such a positional relationship that these hubs are rotatably mounted coaxially about a rotational axis and adjacent each other along the rotational axis. More particularly, in this disclosed arrangement, a wrap spring is mounted about the outer circumference of the input hub and the outer circumference of the output bub, and a control collar is disposed about the wrap spring, with one end of the wrap spring being supported to the input hub and the other end thereof being supported to the control collar.

In this PTL 1, when no magnetic force is applied to an armature provided in the control collar, there is provided a clutch-disengaged state in which the armature is maintained at a predetermined position by an urging force of a return spring, and the wrap spring is detached from the outer circumference of the input hub and the outer circumference of the output hub. Then, when a magnetic force is applied to the armature provided in the control collar, there is provided a state in which this magnetic force draws the armature toward the magnetic solenoid against the urging force of the return spring and a rotational force of the control collar is transmitted to the output hub. With this, there is reached a state wherein the coil diameter of the wrap spring is reduced, so that the wrap spring is brought into pressure-contact with the outer circumference of the input hub and the outer circumference of the output hub, thus transmitting the rotational drive force of the input hub to the output hub. In this way, a clutch-engaged state is realized.

Further, PTL 2 discloses an arrangement of an electromagnetic clutch as follows. In this, a wrap spring is mounted across/between an outer circumference of a drive pulley (an input pulley in this document) and an outer circumference of an output hub rotatable in union with a shaft (a pump shaft in this document). One end of this wrap spring is supported to an armature and the outer end of the spring is supported to the output hub. The drive pulley incorporates an electromagnetic solenoid for applying an attraction force to the armature.

In this PTL 2, when no magnetic force is applied from the electromagnetic solenoid to the armature, there is provided a clutch-disengaged state wherein the wrap spring is detached from the outer circumferences of the input pulley and of the output hub. When a magnetic force is applied from the electromagnetic solenoid to the armature, there is provided a clutch-engaged state wherein the wrap spring is brought into pressure-contact with the outer circumferences of the input pulley and the output hub, thus allowing transmission of the drive force of the drive pulley to the shaft.

CITATION LIST

Patent Literature

PTL 1: Japanese Unexamined Patent Application Publication No. 11-201191

PTL 2: Japanese Unexamined Patent Application Publication No. 2001-317565

SUMMARY OF INVENTION

Technical Problem

As described in PTL 1 or PTL 2, in the case of an electromagnetic clutch configured to provide a transmission state through energization of an electromagnetic solenoid, it is necessary to continue the energization in the case of force (power) transmission. For instance, if such clutch is employed in a portion such as in a water pump of an engine where the transmission state (clutch-engaged state) is continued for a long time, the above arrangement leads to inconvenience of wasteful electric power consumption. In particular, with an electromagnetic clutch configured to maintain the transmission state through energization, in order to be able to provide continuation of the transmission in a reliable manner, this will invite enlargement of the electromagnetic clutch so as to be able to cope with reduction in the magnetic flux associated with temperature rise, thus leading to cost increase disadvantageously. Moreover, if energization is disabled due to a failure, the arrangement will be unable to function as a water pump, thus leading to overheating of the engine.

Furthermore, in the case of the arrangement disclosed in PTL 1, in a magnetic circuit formed between the electromagnetic solenoid and the armature, an air gap is formed between a rotor coupled with the output hub to be rotatable therewith and the fixed electromagnetic solenoid. Thus, the arrangement requires a strong electromagnetic solenoid. In addition, since the input hub and the output hub are disposed in close vicinity with each other, even in the case of no-energization of the electromagnetic solenoid, there may sometimes occur inadvertent co-rotation of the input hub and the output hub, depending on the posture of the wrap spring and the contact condition between the wrap spring and the output hub.

Similarly to the above, in the case of the arrangement of PTL 2 also, in the case of clutch-engaged state also, an air gap is formed between the rotatable input pulley and the fixed output electromagnetic solenoid, in the magnetic circuit between the electromagnetic solenoid and the armature. Hence, this arrangement too requires a strong electromagnetic solenoid.

When an electromagnetic clutch for use in a water pump is contemplated, in addition to compactization thereof, it is also desired that the arrangement thereof will not require significant design change when modified to employ a drive pulley having a different outer contour.

The object of the present invention is to provide an electromagnetic clutch configured to reach a blocking state in response to switchover of an electromagnetic solenoid from a non-driving state to a driving state and to restrict wasteful energy consumption in this blocking state and to provide such clutch with a compact and rational arrangement.

Solution to Problem

According to a characterizing feature of the present invention, an electromagnetic clutch comprises:

a drive pulley having, on its outer circumference side, a cylindrical belt-entraining portion about which a length of a drive belt is entrained and having, on its inner circumference side, a tubular portion rotatable in unison with the belt-entraining portion and supported to a stationary system;

a wrap spring wrapped around the outer circumference of the tubular portion and placed in pressure-contact therewith under a natural condition;

a shaft rotatably supported to the stationary system and mounted coaxial with a rotational axis of the drive pulley, the shaft being rotatably driven when receiving a force from the drive pulley;

a drive member fixed to the shaft, one end of the wrap spring being coupled to the drive member;

an operational member formed of a magnetic matter, the operational member being coaxially rotatable relative to the shaft, with the other end of the wrap spring coupled to the operational member, the operational member being movable along an extending direction of the shaft; and an electromagnetic solenoid provided in the stationary system and configured to generate a magnetic force for fixingly attracting the operational member;

wherein as the electromagnetic solenoid is energized to fixingly attract the operational member thereto, the drive member is rotated relative to the operational member by a frictional force relative to the drive pulley or a dynamic inertia, so that the pressure-contact of the wrap spring relative to the tubular portion is released and force transmission from the drive pulley to the shaft is blocked.

With the above-described arrangement, when the electromagnetic solenoid is not energized, the wrap spring is placed under pressure-contact with the tubular portion, whereby there is realized a transmission state (clutch-engaged state) wherein the rotational force of the drive pulley is transmitted to the shaft via the drive member coupled to one end of the wrap spring. Whereas, when the electromagnetic solenoid is energized, the rotation is prevented since the operational member to which the other end of the wrap spring is coupled is attracted and bound to this electromagnetic solenoid. Then, after this prevention of rotation, the drive member is rotated by the dynamic inertia relative to the operational member. This relative rotation twists the wrap spring, thus releasing its pressure-contact relative to the outer circumference of the tubular portion, whereby there is reached a blocking state (clutch-disengaged state) wherein the force transmission from the drive pulley to the shaft is blocked.

Also, in comparison with the arrangement where at the time of driving, the magnetic flux from the electromagnetic solenoid is caused to be applied to the operational member via an air gap, the above-described inventive arrangement does not require an electromagnetic solenoid having a large capacity, since no air gap is formed. Moreover, as the wrap spring, there is employed one having a coil diameter which allows pressure-contact with the outer circumference of the tubular portion provided at a center-side position of the drive pulley. Hence, it becomes possible to employ a small wrap spring having a small outer diameter. In particular, when the electromagnetic clutch is provided for a drive pulley with a belt-entraining portion having a different diameter through a design change, such drive pulley with a belt-entraining portion having a different radius can have a tubular portion having a same outer diameter, so that when the drive pulley is modified, no change is required in the arrangement of the electromagnetic clutch.

As a result, an electromagnetic clutch configured to reach a blocking state in response to switchover of an electromagnetic solenoid from a non-driving state to a driving state and to restrict wasteful energy consumption in this blocking state has been constructed in a compact manner and with high flexibility in its use.

According to an embodiment of the present invention, the size of the tubular portion as measured in the direction along the rotational axis is set shorter than the size of the belt-entraining portion as measured in the direction along the rotational axis.

With the above, the tubular portion is accommodated within the pulley width in the direction along the rotational axis of the belt-entraining portion of the drive pulley. Hence, it becomes possible to accommodate also the wrap spring within the pulley width, so that the electromagnetic clutch as a whole can be formed compact.

According to an embodiment of the present invention, the shaft is rotatably supported to the inside of a boss-like portion of a housing as the stationary system via an internal bearing mechanism; the tubular portion is rotatably supported to the outside of the boss-like portion via an external bearing mechanism; and the internal bearing mechanism and the external bearing mechanism are disposed at positions where these mechanisms are overlapped with each other as viewed in the direction perpendicular to the rotational axis.

With the above, the internal bearing mechanism and the external bearing mechanism are disposed at positions where these mechanisms are overlapped with each other as viewed in the direction perpendicular to the rotational axis. Hence, in comparison with an arrangement wherein the external bearing mechanism and the internal bearing mechanism are disposed at different positions in the direction of the rotational axis, it becomes possible to reduce the total length of the shaft, so that e.g. an inconvenience of the electromagnetic clutch being disposed at a position protruding from the housing can be restricted.

According to an embodiment of the present invention, there is provided an intermediate member formed of a magnetic body, the intermediate member being disposed on the side opposite the electromagnetic solenoid relative to the operational member, the intermediate member being rotatable in unison with the shaft and being displaceable in the direction along the rotational axis;

the operational member forms a main hole portion in its face to which the electromagnetic solenoid is attracted;

the intermediate member forms an auxiliary hole portion in its face subject to the magnetic flux from the operational member;

the operational member and the intermediate member together constitute a restraining means;

wherein the main hole portion and the auxiliary hole portion are set in their positional relationship to each other such that the restraining means allows rotation of the drive pulley by a dynamic inertia after the operational member is attracted to the electromagnetic solenoid in response to energization of the electromagnetic solenoid and the restraining means increases the attraction force to be applied to the intermediate member after there is reached a rotational phase where the pressure-contact of the wrap spring to the tubular portion is released by the rotation, the increased attraction force attracting the intermediate member to the operational member and restraining the former to the latter.

With the above, when the operational member is attracted to the electromagnetic solenoid, it becomes possible to allow leakage magnetic flux to act on the intermediate member through the main hole portion of this operational member. Further, since an auxiliary hole portion is formed in the intermediate member, at the portion where this auxiliary hole portion is formed, the magnetic resistance is increased thereby to reduce the attraction force. Whereas, at the portion where the auxiliary hole portion is not formed, the magnetic resistance is decreased thereby to increase the attraction force. With this, after the electromagnetic solenoid is energized and then the operational member is attracted to this magnetic solenoid, at the initial stage of subsequent rotation of the drive member by the dynamic inertia, the attraction force applied from the operational member to the intermediate member can be restricted. Then, upon arrival at the rotational phase where the drive pulley is rendered into the blocking state, the attraction force applied to the intermediate member can be increased, so that the intermediate member is attracted and restrained to the operational member with the wrap spring being detached from the tubular portion. As a result, there can be provided a blocking state that does not invite the co-rotation.

According to an embodiment of the present invention, the drive member includes a drive arm, and in this drive arm, there is formed a restricting means for maintaining the wrap spring under a set posture when the wrap spring is released from the pressure-contact relative to the tubular portion and detached from the outer circumference.

According to an embodiment of the present invention, the drive arm extends in the direction of the rotational axis and to the outside of the wrap spring.

According to an embodiment of the present invention, the drive arm includes a protruding piece protruding toward the wrap spring.

According to an embodiment of the present invention, the protruding piece is provided on both sides of the wrap spring in the direction of the rotational axis.

According to an embodiment of the present invention, after the operational member is attracted to the electromagnetic solenoid while the auxiliary hole portion is located at a position within the area of the main hole portion, the auxiliary hole portion is moved out of the area of the main hole portion, whereby the attraction force applied to the intermediate member is increased, so that the intermediate member is attracted to the operational member.

According to an embodiment of the present invention, the drive member is provided on the side opposite the operational member across the intermediate member in the direction of the rotational axis;

the intermediate member is coupled to the drive member via an elastic member, so that the rotational force of the drive member is transmitted to the intermediate member and the intermediate member is urged in the direction away from the electromagnetic solenoid;

the attraction force applied from the electromagnetic solenoid to the intermediate member while the auxiliary hole portion is located within the area of the main hole portion is set smaller than the urging force of the elastic member; and the attraction force applied from the electromagnetic solenoid to the intermediate member while the auxiliary hole portion is located out of the area of the main hole portion is set greater than the urging force of the elastic member.

According to an embodiment of the present invention, the operational member includes a disc-like portion: and in an outer circumference of the disc-like portion, there is provided an engaging portion to which the other end of the wrap spring is coupled.

DESCRIPTION OF EMBODIMENTS

Next, embodiments of the present invention will be explained with reference to the accompanying drawings.
[General Construction]

Figure 1:
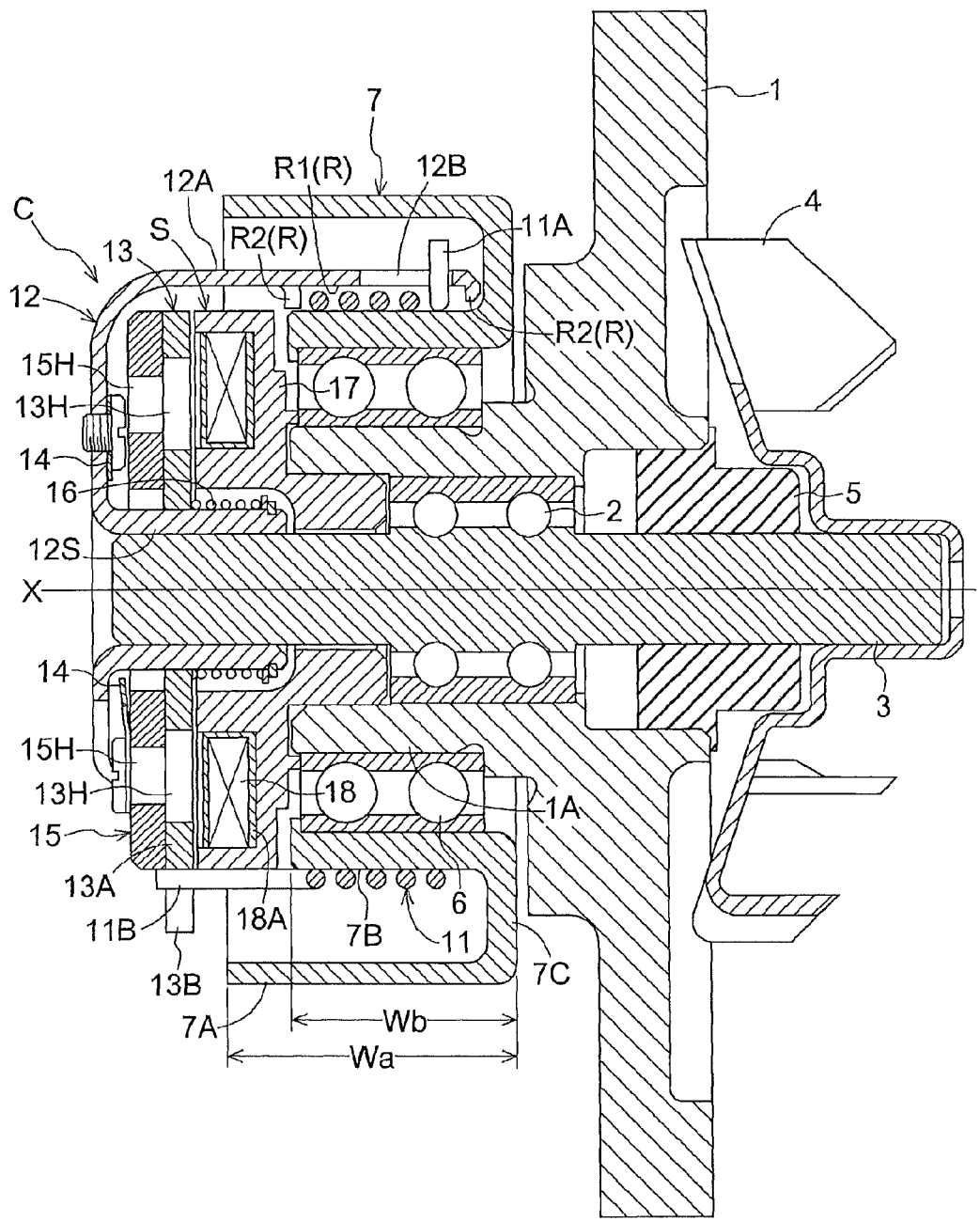
[FIG. 1] is a section view showing a water pump having an electromagnetic clutch.
Figure 2:
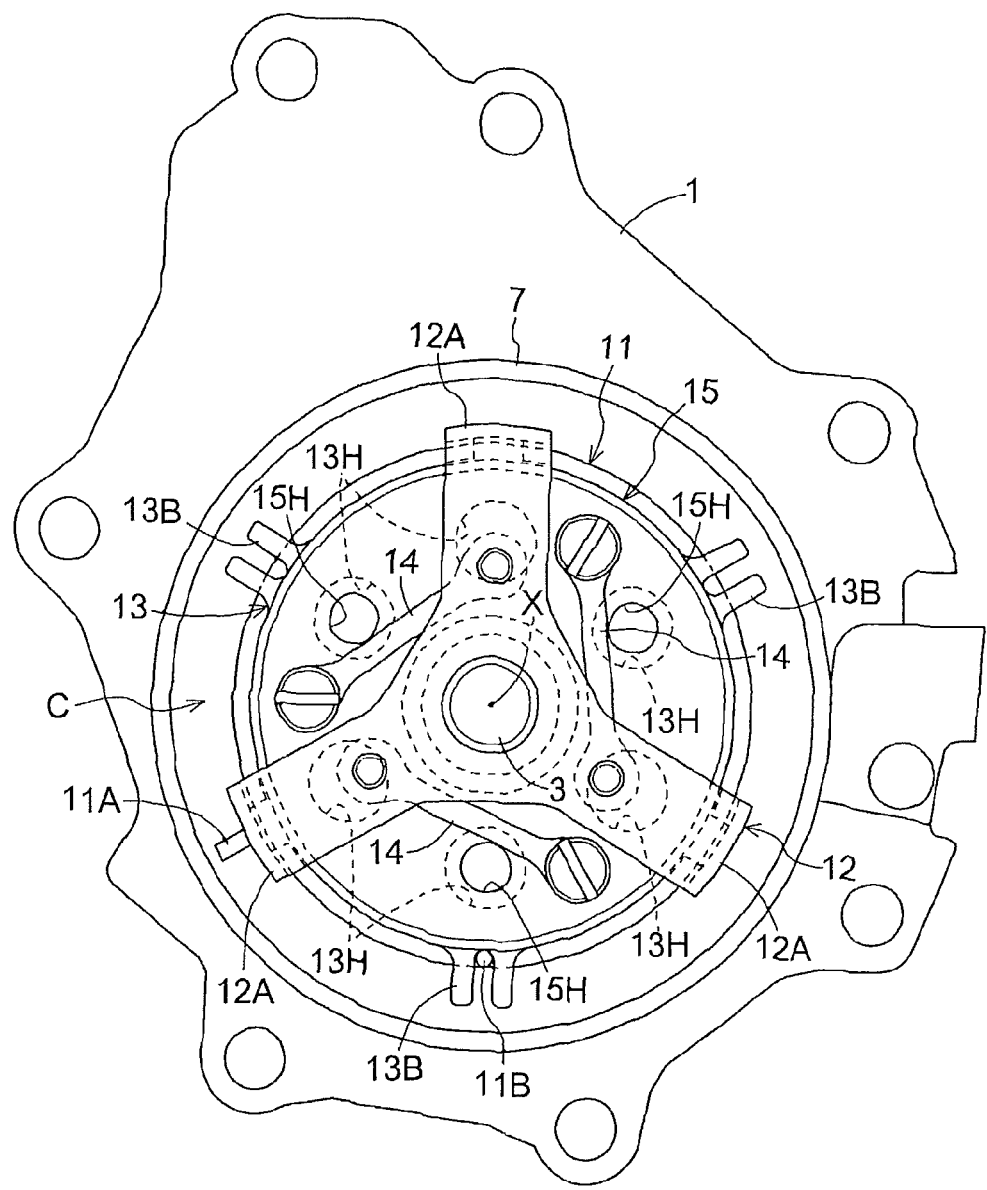
[FIG. 2] is a front view showing a configuration of the electromagnetic clutch.
Figure 3:
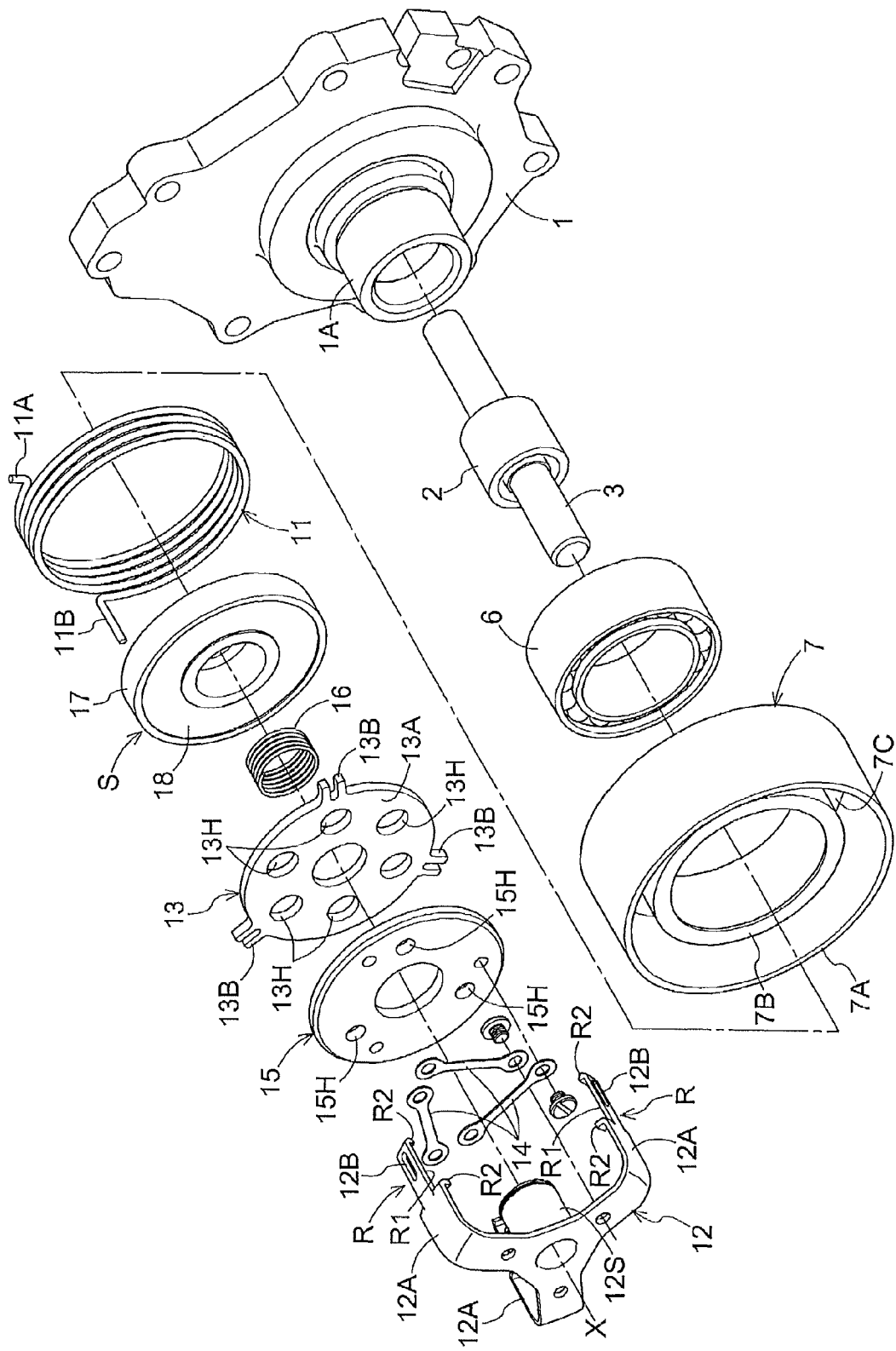
[FIG. 3] is an exploded perspective view of the electromagnetic clutch.

FIGS. 1-3 show a water pump capable of transmission and blocking of power via an electromagnetic clutch C according to the present invention. In this water pump, a shaft 3 is supported via a shaft bearing 2 (an example of "an internal bearing mechanism") to a pump housing 1 as an example of "a stationary system", so that the shaft 3 is rotatable about a rotational axis X. An impeller 4 is mounted to the inner end of the shaft 3, and a seal 5 is provided between the shaft 3 and the pump housing 1. To a boss-like portion 1A of the pump housing 1, there is rotatably mounted a drive pulley 7 rotatable about the rotational axis X via a pulley bearing 6 (an example of "an external bearing mechanism"). The electromagnetic clutch C can be switched over between a transmission state (a clutch-engaged state) wherein a rotational drive force of the drive pulley 7 is transmitted to the shaft 3 and a blocking state (a clutch-disengaged state) wherein the transmission of the rotational drive force of the drive pulley 7 is blocked.

The drive pulley 7 includes a cylindrical belt-entraining portion 7A provided on the outer circumferential side, a tubular portion 7B provided on the center side of a space (the inner circumferential side) enclosed by this belt-entraining portion 7A, and a lateral wall portion 7C disposed on the pump housing side so as to interconnect the belt-entraining portion 7A and the tubular portion 7B, with the above portions 7A, 7B, 7C being integrated with each other. In particular, the tubular portion 7B has a tube length Wb as measured in the direction along the rotational axis X, which length Wb is set shorter than a circumferential width Wa of the belt-entraining portion 7A as measured in the direction along the rotational axis X, so that the tubular portion 7B is accommodated within the inner space of the belt-entraining portion 7A. And, the drive pulley 7 is rotatably supported to the pump housing 1, with the tubular portion 7B being fitted on the pulley bearing 6. With this, the tubular portion 7B and the shaft 3 are supported to be rotatable relative to each other about the rotational axis X.

This drive pulley 7 is configured to employ a flat belt. However, the drive pulley 7 may alternatively define a V-shaped groove in its outer circumference in order to employ a V-shaped belt. Further alternatively, the drive pulley 7 may form gear-like teeth in its outer circumference in order to employ a timing belt.

A length of endless belt is entrained between and around an output pulley (not shown) mounted on an output shaft of an engine (not shown) and the drive pulley 7, so that the drive pulley 7 is constantly driven. The electromagnetic clutch C is controlled by a controller (not shown) which obtains a detection result of a temperature sensor (not shown) that detects a water temperature of cooling water. According to a control scheme executed by this controller, when the controller detects that the water temperature of the cooling water is low as is the case with e.g. immediately after engine start-up (insufficient warm-up of the engine), the controller maintains the electromagnetic clutch C under the blocking state for promoting warm-up. Whereas, when the controller detects that the temperature of the engine has risen appropriately, the controller sets the electromagnetic clutch C to the transmission state for circulating the cooling water by driving of the impeller 4.

[Electromagnetic Clutch]

The electromagnetic clutch C includes a coil-like wrap spring 11 accommodated inside the drive pulley 7, a drive member 12, an operational member 13 functioning as an armature, an intermediate member 15 and an electromagnetic solenoid S for applying an attraction force to the operational member 13 for attracting it thereto.

To the inner circumferential face of the boss-like portion 1A of the pump housing 1, there is fixedly provided a yoke 17 formed of a magnetic body such as iron, a nickel alloy or the like and formed like a ring. This yoke 17 defines an annular recess in the form of a ring coaxial with the rotational axis X and open on the side opposite the impeller 4. Then, a length of coil 18 comprised of a copper wire wound about a bobbin 18A is fitted in this recess, thus constituting the electromagnetic solenoid S. This electromagnetic solenoid S forms magnetically attracting faces in the ring-like areas about the rotational axis X on the inner side and the outer side of the recess in which the coil 18 is inserted.

The wrap spring 11 employed herein has a coil-like shape formed of a helically coiled spring steel and has such a coil diameter that the spring 11 may be placed under a pressure-contact with the outer circumference of the tubular portion 7B of the drive pulley 7 under a "natural" state (a state free from application of any external force). Under this pressure-contact state, the axis of the coil-like portion of the wrap spring 11 will be disposed coaxially with the rotational axis X. Also, one side end 11A ("one end") of the wrap spring 11 on the side of the pump housing in the direction along the rotational axis X is bent radially outwards, whereas the other side end 11B ("the other end") thereof on the outer side is bent outwards under a posture along the rotational axis X.

The drive member 12 is fixed as its sleeve portion 12S formed coaxial with the rotational axis X to be rotatable in unison with the shaft 3 is engaged and coupled with the front end of the shaft 3. The drive member 12 includes three drive arms 12A bent from the outer circumference portions to extend parallel with the rotational axis X and toward the pump housing 1. And, the one side end 11A (one end) of the wrap spring 11 is coupled with the drive member 12, as the one side end 11A being inserted to an engaging hole portion 12B defined in one of the three drive arms 12A.

The operational member 13 includes a disc-like portion 13A formed of a magnetic body using an iron material, a nickel alloy material or the like and provided in the form of a disc centering about the rotational axis X. And, three engaging portions 13B each having an engaging recess are integrally formed to protrude outwards from the outer circumference of this disc-like portion 13A. And, into one engaging recess formed in one of these three engaging portions 13B, the other side end 11B of the wrap spring 11 is inserted, thus being engaged and coupled therewith. The disc-like portion 13A has a radius in agreement with the radius of the outer circumference of the attracting face of the electromagnetic solenoid S, and at the center position of this disc-like portion 13A, there is formed a through hole portion.

This operational member 13 is loosely supported to the sleeve portion 12S as being inserted into the through hole portion, so that the operational member 13 is rotatable relative to the shaft 3 and movable in the direction along the rotational axis X. On the sleeve portion 12S, a coil spring 16 is fitted. With the urging force of this coil spring 16, the operational member 13 is urged in the direction away from the yoke 17 of the electromagnetic solenoid S.

The intermediate member 15 is comprised of a magnetic body using an iron material, a nickel alloy material or the like, in the form of a disc centering about the rotational axis X. And, the intermediate member 15 is loosely supported to the sleeve portion 12S to be rotatable relative to the shaft 3 and and movable in the direction along the rotational axis X. This intermediate member 15 has a radius in agreement with the radius of the outer circumference of the attracting face of the electromagnetic solenoid S and is disposed at a position sandwiched between the operational member 13 and the drive member 12. And, the intermediate member 15 is operably coupled to the drive member 12 via a plate spring 14 to be rotatable in unison with the drive member 12.

This intermediate member 15 is supported at a position coming into contact with the operational member 13 with the urging force of the plate spring 14, when no external force is applied thereto. And, when a magnetic attraction force is applied thereto from the operational member 13, the intermediate member 15 can be displaced along the rotational axis X toward the operational member 13 due to elastic deformation that will occur in the three plate springs 14.

The three drive arms 12A of the drive member 12 are formed equidistantly along the circumferential direction so as to obtain rotational balance therebetween. As these three drive arms 12A are disposed on the outer side of the wrap spring 11, a restricting means R is formed in this drive arm 12A so as to maintain the wrap spring 11 under a set posture when the wrap spring 11 is detached from the outer circumference of the tubular portion 7B. More particularly, the drive arm 12A is constituted as a first restricting portion R1 for restricting displacement of the wrap spring 11 in the direction away from the rotational axis X. Further, respectively at the extending side end and an intermediate position of the three drive arms 12A, there is formed a protruding piece protruding toward the wrap spring 11 (the direction toward the rotational axis). This pair of protruding pieces together constitute a second restricting portion R2 for restricting displacement of the wrap spring 11 in the direction along the rotational axis X.

The outer diameter of the outermost circumference of the attracting face of the electromagnetic solenoid S is set to be equal to the outer diameter of the above-described operational member 13 and the outer diameter of the intermediate portion 15. However, it is not absolutely needed for the outer diameters of the operational member 13 and the intermediate member 15 to agree in size with the outer diameter of the attracting face. The outer diameters can be slightly larger or smaller as long as such diameters allow efficient working of the magnetic flux of the electromagnetic solenoid S.

Figure 4A:
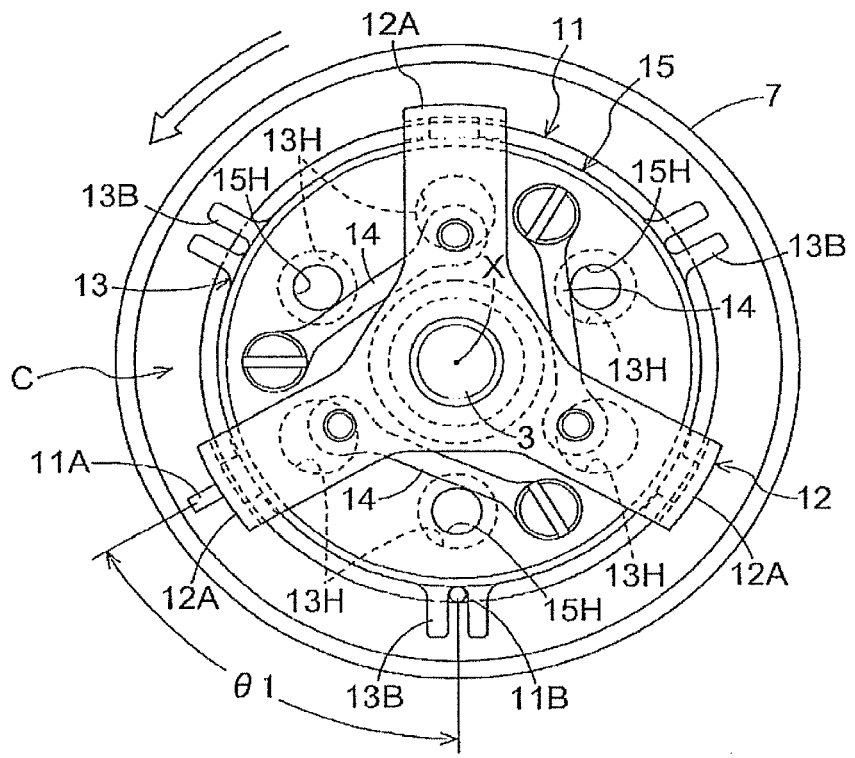
[FIG. 4(a) and FIG. 4(b)] are a front view and a section view showing the electromagnetic clutch under a transmission state.
Figure 4B:
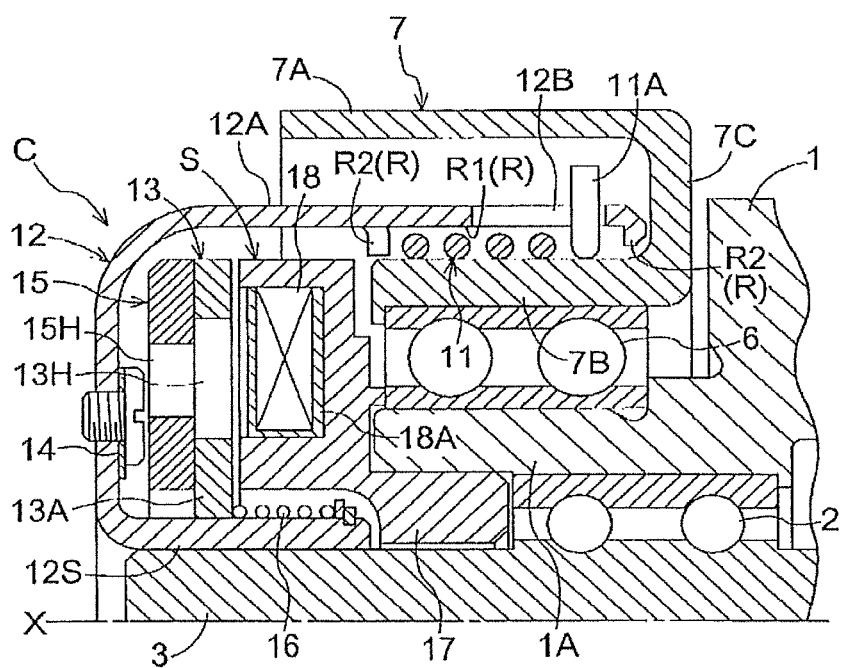

This electromagnetic clutch C is rendered into the transmission state (clutch-engaged state) as the one side end 11A and the other side end 11B (the other end) of the wrap spring 11 maintain the respective relative posture shown in FIG. 4 (*a*) thereby to place the wrap spring 11 into the pressure-contact with the outer circumference of the tubular portion 7B of the drive pulley 7. Also, under this transmission state, the drive arms 12A of the drive member 12 and the engaging portions 13B of the operational member 13 are maintained under the relative posture illustrated in the same drawing. Conversely, as the one side end 11A and the other side end 11B of the wrap spring 11 are changed from the relative posture illustrated in FIG. 5 (*a*) to a relative posture illustrated in FIG. 6 (*a*), the wrap spring 11 is twistingly operated to increase its coil diameter. With this, the wrap spring 11 is detached from the tubular portion 7B of the drive pulley 7, thus providing the blocking state (clutch-disengaged state) shown in FIG. 6 (*a*). Under this blocking state, the drive arms 12A of the drive member 12 and the engaging portions 13B of the operational member 13 are maintained under the relative posture illustrated in the same figure.

In particular, with the inventive electromagnetic clutch C, under its blocking state, it is not absolutely needed for the wrap spring 11 to be completely detached from the outer face of the tubular portion 7B (not absolutely needed to provide a restraining means to be described later). Alternatively, the clutch C may be configured such that the force transmission between the drive pulley 7 and the shaft 3 is blocked in response to reduction in the pressure contact force applied from the wrap spring 11 to the outer face of the tubular portion 7B. In this case, under the blocking state, the wrap spring 11 will lightly contact the outer face of the tubular portion 7B.

With this electromagnetic clutch C, the drive member 12, the operational member 13 and the electromagnetic solenoid S together constitute "an operational mechanism". When electric power is supplied to the electromagnetic solenoid S, the restraining means sets the drive arms 12A of the drive member 12 and the engaging portions 13B of the operational member 13 to the relative posture illustrated in FIG. 7 (*a*). And, the blocking state is maintained by continuation of the power supply to the electromagnetic solenoid S. The operational mode of this restraining means will be explained next.

[Electromagnetic Clutch: Restraining Means]

The operational member 13 and the intermediate member 15 together constitute the restraining means. As shown in FIG. 1, FIG. 3 and FIG. 4 (a), the disc-like portion 13A of the operational member 13 defines a plurality of main hole portions 13H along the circumferential direction. Whereas, the intermediate member 15 defines a plurality of auxiliary hole portions 15H along the circumferential direction thereof. These main hole portions 13H and the auxiliary hole portions 15H function in cooperation for setting the drive arms 12A of the drive member 12 and the engaging portions 13B of the operational member 13 to the relative posture illustrated in FIG. 7 (*a*) when the electromagnetic clutch C is operated to the blocking state. This mode of operation will be described next. Incidentally, as the main hole portions 13H and the auxiliary hole portions 15H, three of each of these are illustrated in the figures. However, the number of these is not limited to three, but may be any other desired number.

When the electromagnetic solenoid S is under the non-driving state with absence of power supply thereto, as shown in FIG. 4 (*b*), the operational member 13 is located at a position detached from the yoke 17 of the electromagnetic solenoid S by the urging force of the coil spring 16, thus forming a gap therebetween. Under this condition, by this urging force, the wrap spring 11 is placed in pressure-contact with the outer circumferential face of the tubular portion 7B of the drive pulley 7; and the drive arms 12A of the drive member 12 and the engaging portions 13B of the operational member 13 are maintained under the relative posture illustrated in FIG. 4 (*a*). As a result, a rotational drive force is transmitted to the shaft 3 from the drive member 12 coupled with the wrap spring 11, and the electromagnetic clutch C is maintained under the transmission state.

Under this transmission state, the relative angle between the drive arm 12A and the engaging portion 13B is maintained at a transmission angle θ1, and as shown in the same figure, the respective relative positional relationship is set such that the auxiliary hole portion 15H is located within the main hole portion 13H as viewed in the direction along the rotational axis X.

Figure 5A:
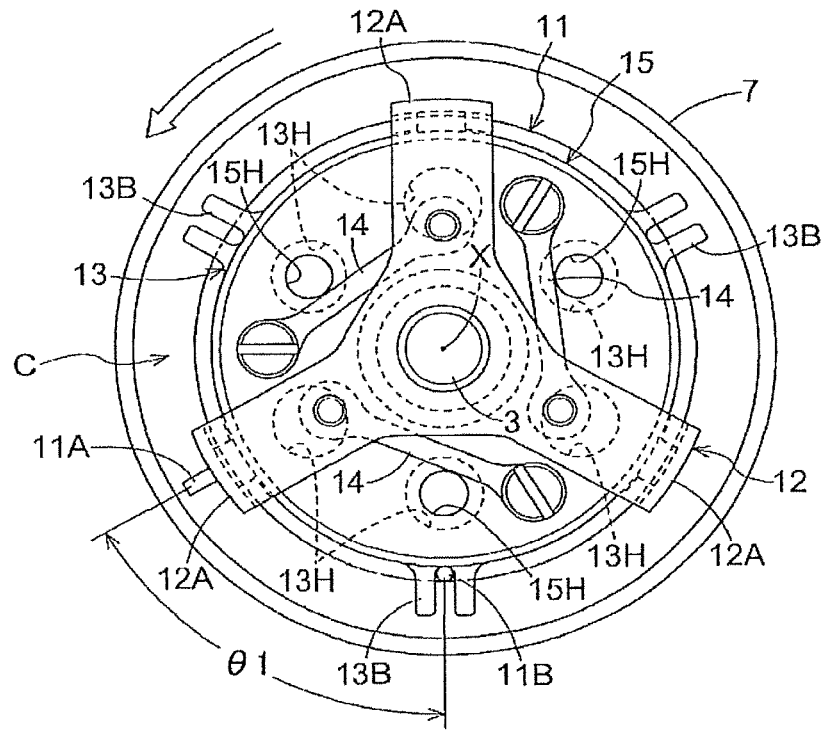
[FIG. 5(a) and FIG. 5(b)] are a front view and a section view showing the electromagnetic clutch under a state where an operational member is attracted to an electromagnetic solenoid.
Figure 5B:
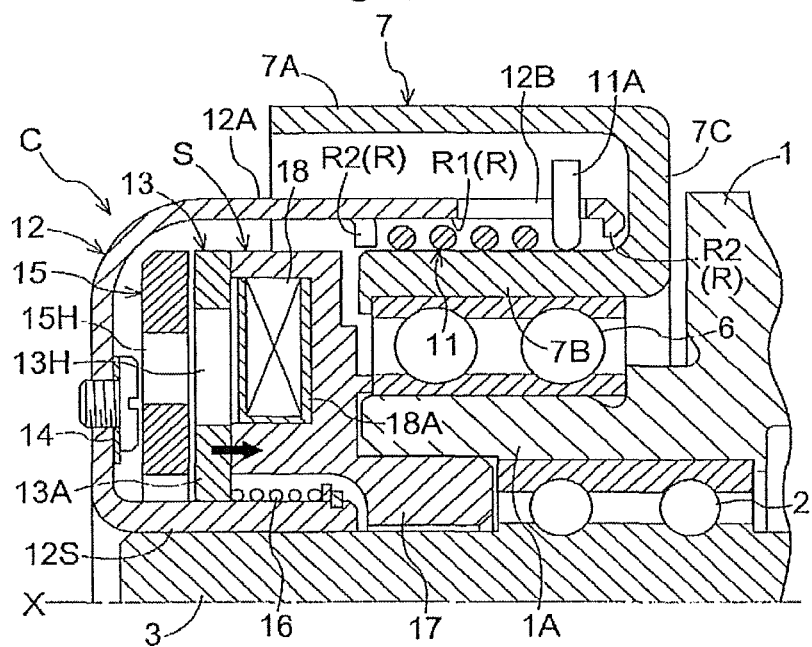

Next, when the mode is switched over to the drive mode for supplying power to the coil 18 of the electromagnetic solenoid S, as shown in FIG. 5 (b), the disc-like portion 13A of the operational member 13 is attracted to the electromagnetic solenoid S (the attracting face of the yoke 17) against the urging force of the coil spring 16, whereby the operational member 13 is restrained. At the timing of this magnetic attraction, as shown in FIG. 5 (*a*) seen in the direction along the rotational axis X, the auxiliary hole portion 15H is present in the inner area of the main hole portion 13H. Under this positional relationship, the auxiliary hole portion 15H functions as a magnetic resistance, so that the magnetic flux density of the magnetic flux flowing from the main hole portion 13H to the intermediate member 15 is restricted by the auxiliary hole portion 15H.

With this electromagnetic clutch C, under the above-described condition where the magnetic flux density is restricted immediately after switchover of the electromagnetic solenoid S to the driving state, since the attraction force applied from the operational member 13 to the intermediate member 15 is set smaller than the urging force applied from the three plate springs 14 to the intermediate member 15, the intermediate member 15 will not be attracted to the operational member 13.

Figure 6A:
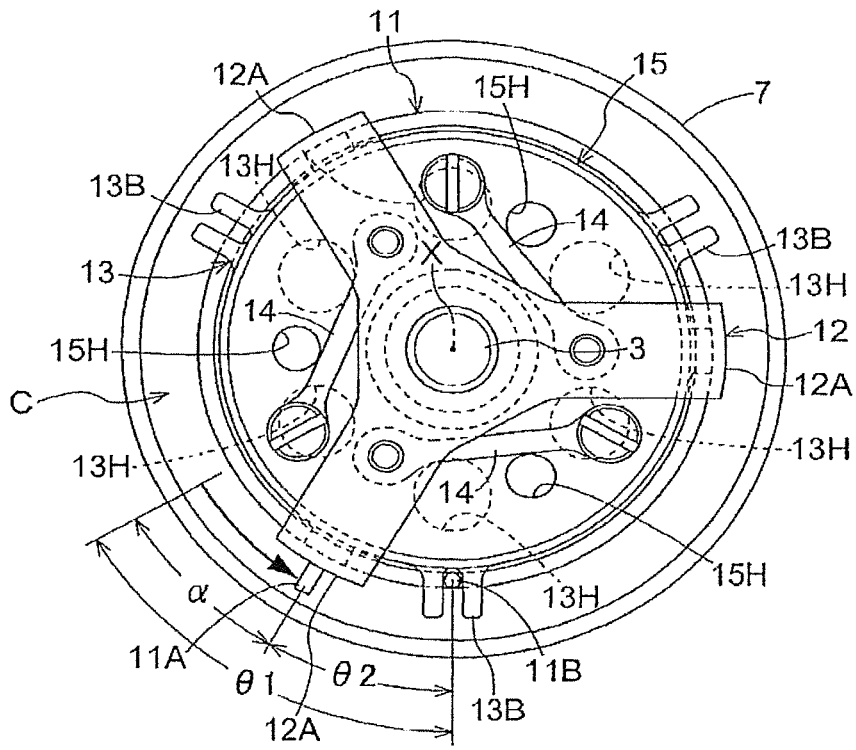
[FIG. 6(a) and FIG. 6(b)] are a front view and a section view showing the electromagnetic clutch under a condition when a drive member is rotated by a dynamic inertia.
Figure 6B:
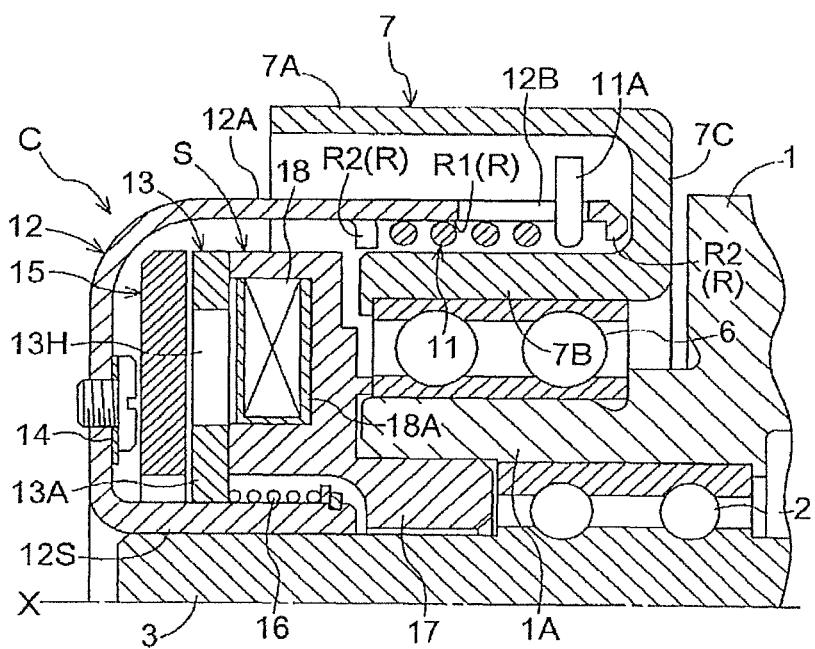

Further, even after the restraint of rotation of the operational member 13, the drive member 12 will continue its rotation in the direction denoted by arrow in FIG. 5 (*b*) by a dynamic inertia, so that this rotational force twistingly operates the wrap spring 11 for increasing its coil diameter, and as shown in FIGS. 6 (*a*) and (*b*), the wrap spring 11 will be caused to be detached from the outer circumferential face of the tubular portion 7B of the drive pulley 7. During the rotation of the drive member 12 by the dynamic inertia as described above, there is maintained the condition wherein the auxiliary hole portion 15H is present in the inner area of the main hole portion 13H as seen in the direction along the rotational axis X. Therefore, the attraction force applied to the intermediate member 15 is not increased, so that the intermediate member 15 will not be attracted to the operational member 13 as illustrated in FIG. 6 (*b*).

Figure 7A:
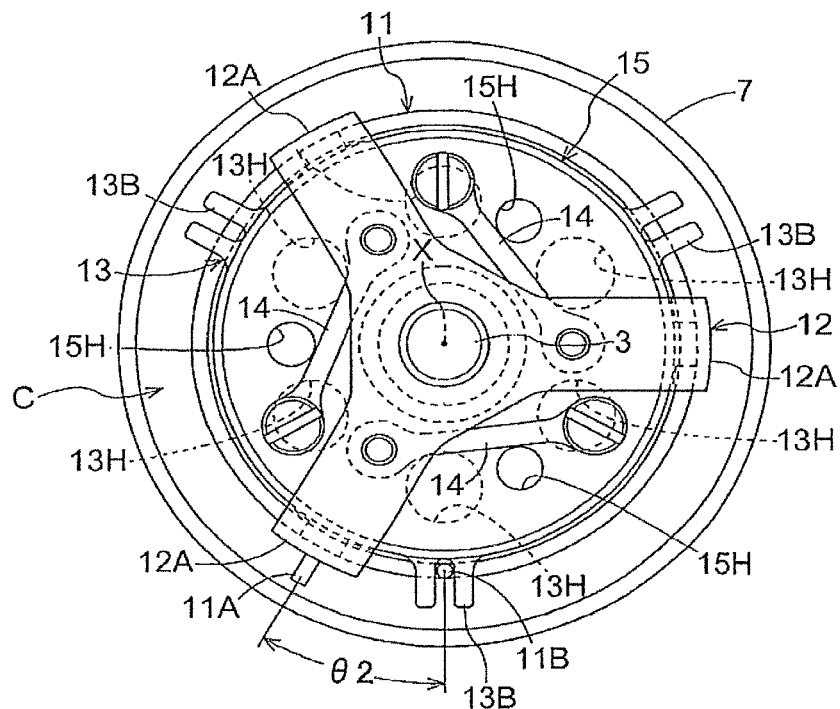
[FIG. 7(a) and FIG. 7(b)] are a front view and a section view showing the electromagnetic clutch under a condition when an intermediate member is attracted to the operational member.
Figure 7B:
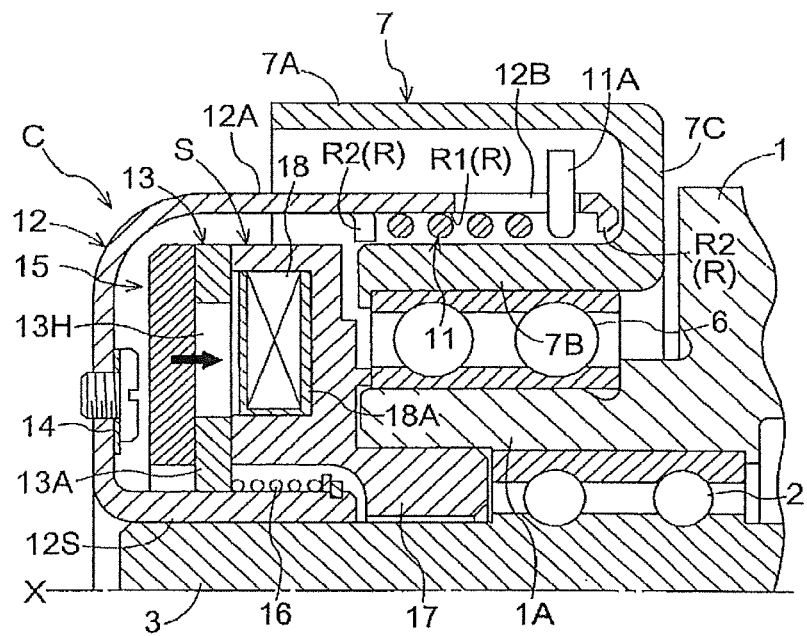

With the above rotation, as illustrated in FIG. 6 (*a*) and FIG. 7 (*a*) as seen in the direction along the rotational axis X, the auxiliary hole portion 15H will be moved to the area outside the main hole portion 13H (area where no hole is present). Then, when the relative angle between the drive arm 12A of the drive member 12 and the engaging portion 13B of the operational member 13 reaches a blocking angle θ2, as illustrated in FIG. 7 (*b*), the intermediate member 15 will be displaced along the rotational axis X to be attracted to the operational member 13. That is, under this positional relationship, there occurs significant reduction in the magnetic resistance in the area from the outer circumferential position of the main hole portion 13H to the intermediate member 15, so that there occurs increase in the magnetic flux density of the magnetic flux flowing to the intermediate member 15. As a result, the attraction force applied to the intermediate member 15 becomes greater than the urging force applied from the three plate springs 14 to the intermediate member 15 in the detaching direction, so that the intermediate member 15 will be attracted to the operational member 13. At the time of this arrival at the blocking angle θ2, the relative angle of the drive arm 12A relative to the engaging portion 13B of the operational member 13 is changed by a change angle α.

When the intermediate member 15 is attracted to the operational member 13, rotation of the drive member 12 too is blocked and the relative posture between the drive arm 12A of the drive member 12 and the engaging portion 13B of the operational member 13 is maintained under the relationship illustrated in FIG. 7 (b) against the urging force of the wrap spring 11. With this, the wrap spring 11 is detached from the outer circumference of the tubular portion 7B of the drive pulley 7, whereby there is realized a complete blocking state. Under this blocking state, the rotational drive force of the drive pulley 7 is not transmitted to the impeller 4 and also water supply by the water pump is stopped.

Upon realization of the above condition of the wrap spring 11 becoming detached from the outer circumference of the tubular portion 7B in response to a twisting operation of the wrap spring 11 with the driving of the electromagnetic solenoid S, the first restricting portion R1 constituted by the drive arms 12A restricts the displacement of the wrap spring 11 in the direction away from the rotational axis X or displacement thereof in the direction toward the axis X. Simultaneously with this, the second restricting portion R2 restricts displacement of the wrap spring 11 in the direction along the rotational axis X. With this restriction, the wrap spring 11 is retained at a predetermined position on the outer side of the tubular portion 7B. Hence, occurrence of such inconvenience as frictional wear of the spring 11 due to contact with the tubular portion 7B and wasteful consumption of driving energy can be resolved.

Thereafter, when the driving of the electromagnetic solenoid S is stopped, the intermediate member 15 is detached from the operational member 13 by the urging force of the plate spring 14, and this operational member 13 is detached from the attracting face of the yoke 17 by the urging force of the coil spring 16. Then, as the wrap spring 11 is rendered into a free state, the coil diameter thereof will be reduced by the urging force, so that the spring 11 will be placed into pressure-contact with the outer circumference of the tubular portion 7B of the drive member 7, thus returning to the transmission state.

[Function/Effect in Embodiments]

As described above, with the electromagnetic clutch according to the present invention, transmission is effected by bringing the wrap spring 11 into pressure-contact with the outer circumference of the tubular portion 7B of the drive pulley 7. Therefore, even when this electromagnetic clutch C is provided for a drive pulley 7 whose belt-entraining portion 7A has a different diameter due to a modification, by forming a tubular portion 7B of the same diameter in each drive pulley 7 in advance, there will arise no need for change in the configuration of the electromagnetic clutch C.

As the tubular portion 7B is sized to be accommodated within the inner space of the drive pulley 7, there is realized compactization of the whole electromagnetic clutch. Since the shaft bearing 2 for supporting the shaft 3 to the boss-like portion 1A and the pulley bearing 6 for supporting the tubular portion 7B of the drive pulley 7 to the boss-like portion 1A are disposed at positions overlapped with each other as seen in the direction perpendicular to the rotational axis X, the total length of the shaft 3 is reduced so that strength of this supporting portion too can be improved.

Further, since the operational member 13 is provided in the form of a disc, in comparison with e.g. such a member having an arm in its outer circumference, it is possible not only to form this operational member 13 compact, but also to reduce the dynamic inertia. Therefore, when electric power is supplied to the electromagnetic solenoid S for disengaging operation of the electromagnetic clutch, the operational member 13 can be attracted speedily to the attracting face of the electromagnetic solenoid S. As a result, rotation by dynamic inertia too can be restricted and there can be realized reduction in the time required for reaching the disengaged state.

Under the blocking state, the wrap spring 11 can be maintained under the set posture at a position detached from the tubular portion 7B by the restraining means. Therefore, force transmission for detaching the wrap spring from the tubular portion 7B can be blocked in a reliable manner. Furthermore, under the blocking state, the first restricting portion R1 and the second restricting portion R2 allow restraint free from posture disturbance of the wrap spring 11 at the position detached from the tubular portion 7B. So, non-uniform frictional wear will not occur in the wrap spring 11 or the tubular portion 7B; thus, frictional wear thereof can be restricted. Moreover, under the blocking state, no contact of the wrap spring 11 with the tubular portion 7B of the drive pulley 7 occurs and uniform pressure-contact between the wrap spring 11 and the tubular portion 7B of the drive pulley 7 at the time of clutch engagement can be realized. Hence, inconvenience of wasteful consumption of driving energy can be resolved.

Figure 8:
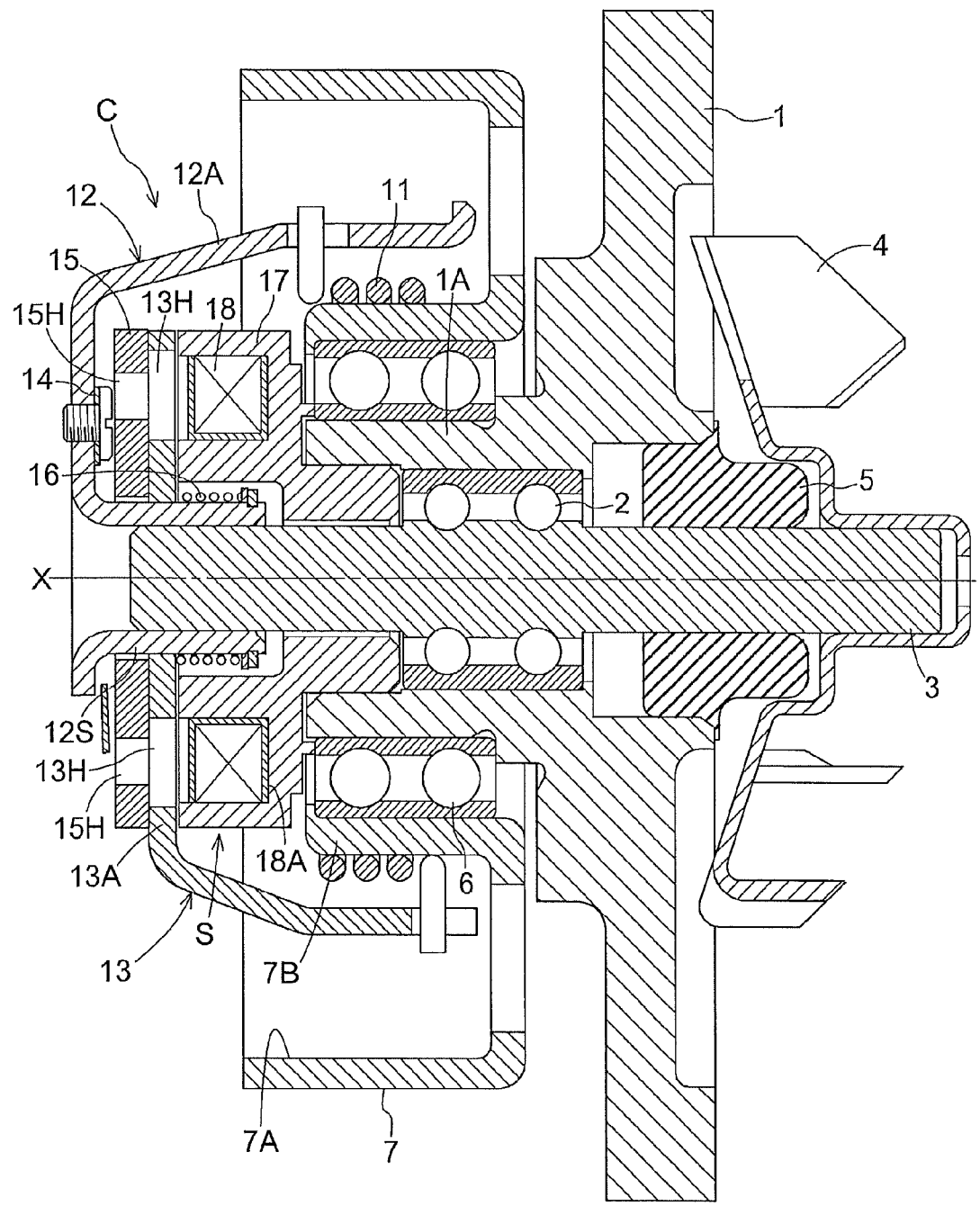
[FIG. 8] is a section view showing a water pump having a similar configuration to FIG. 1.

FIG. 8 shows a section of a water pump having a similar configuration to FIG. 1.

In the instant embodiment, the electromagnetic clutch C is configured such that the wrap spring 11 comes into pressure-contact with the outer circumference of the tubular portion 7B formed at the center side of the drive pulley (input pulley) 7. Needless to say, as this wrap spring 11 to be employed herein, such spring that comes into pressure-contact with the outer circumference of the tubular portion7B under its natural condition will be employed; and the restraining means is constituted of the operational member (armature) 13 and the intermediate member (armature) 15.

With this configuration, when the operational member (armature) 13 is attracted to the electromagnetic solenoid S, in the area where the auxiliary hole portion 15H is present in the inside area of the main hole portion 13H, the intermediate member (armature) 15 is not attracted to the operational member (armature) 13 and the drive member 12 will continue its rotation by dynamic inertia. Thereafter, when the auxiliary hole portion 15H has moved into the area outside the main hole portion 13H (area free of hole), the intermediate member (armature) 15 is attracted to the operational member (armature) 13, and the wrap spring 11 is detached from the tubular portion 7B of the drive pulley 7, so that the electromagnetic clutch C is rendered into the blocking state.

Industrial Applicability

The present invention can be used in a transmission system of not only a water pump, but also a radiator fan, a supercharger, etc.

REFERENCE SIGNS LIST 1 stationary system/housing (pump housing)
1A boss-like portion
2 internal bearing mechanism (shaft bearing)
3 shaft
6 external bearing mechanism (pulley bearing)
7 drive pulley
7A belt-entraining portion
11 wrap spring 11A one side end
11B the other side end
12 drive member
12A drive arm
13 operational member
13A disc-like portion
13B engaging portion
13H main hole portion
15 intermediate member
15H auxiliary hole portion
R restricting means
S electromagnetic solenoid
Wa circumferential width
Wb tube length
X rotational axis

The invention claimed is:

1. An electromagnetic clutch comprising:
a drive pulley having, on its outer circumference side, a cylindrical belt-entraining portion about which a length of a drive belt is entrained and having, on its inner circumference side, a tubular portion rotatable in unison with the belt-entraining portion and supported to a stationary system;
a wrap spring wrapped around the outer circumference of the tubular portion and placed in pressure-contact therewith under a natural condition;
a shaft rotatably supported to the stationary system and mounted coaxial with a rotational axis of the drive pulley, the shaft being rotatably driven when receiving a force from the drive pulley;
a drive member fixed to the shaft, one end of the wrap spring being coupled to the drive member;
an operational member formed of a magnetic matter, the operational member being coaxially rotatable relative to the shaft, with the other end of the wrap spring coupled to the operational member, the operational member being movable along an extending direction of the shaft; and
an electromagnetic solenoid provided in the stationary system and configured to generate a magnetic force for fixingly attracting the operational member;
wherein as the electromagnetic solenoid is energized to fixingly attract the operational member thereto, the drive member is rotated relative to the operational member by a frictional force relative to the drive pulley or a dynamic inertia, so that the pressure-contact of the wrap spring relative to the tubular portion is released and force transmission from the drive pulley to the shaft is blocked.

2. The electromagnetic clutch according to claim 1, wherein
the size of the tubular portion as measured in the direction along the rotational axis is set shorter than the size of the belt-entraining portion as measured in the direction along the rotational axis.

3. The electromagnetic clutch according to claim 1, wherein the shaft is rotatably supported to the inside of a boss-like portion of a housing as the stationary system via an internal bearing mechanism; the tubular portion is rotatably supported to the outside of the boss-like portion via an external bearing mechanism; and the internal bearing mechanism and the external bearing mechanism are disposed at positions where these mechanisms are overlapped with each other as viewed in the direction perpendicular to the rotational axis.

4. The electromagnetic clutch according to claim 1, wherein there is provided an intermediate member formed of a magnetic body, the intermediate member being disposed on the side opposite the electromagnetic solenoid relative to the operational member, the intermediate member being rotatable in unison with the shaft and being displaceable in the direction along the rotational axis;
the operational member forms a main hole portion in its face, the electromagnetic solenoid being attracted to the operational member;
the intermediate member forms an auxiliary hole portion in its face subject to the magnetic flux from the operational member;
the operational member and the intermediate member together constitute a restraining means;
wherein the main hole portion and the auxiliary hole portion are set in their positional relationship to each other such that the restraining means allows rotation of the drive pulley by a dynamic inertia after the operational member is attracted to the electromagnetic solenoid in response to energization of the electromagnetic solenoid and the restraining means increases the attraction force to be applied to the intermediate member after there is reached a rotational phase where the pressure-contact of the wrap spring to the tubular portion is released by the rotation, the increased attraction force attracting the intermediate member to the operational member and restraining the former to the latter.

5. The electromagnetic clutch according to claim 4, wherein after the operational member is attracted to the electromagnetic solenoid while the auxiliary hole portion is located at a position within the area of the main hole portion, the auxiliary hole portion is moved out of the area of the main hole portion, whereby the attraction force applied to the intermediate member is increased, so that the intermediate member is attracted to the operational member.

6. The electromagnetic clutch according to claim 5, wherein the drive member is provided on the side opposite the operational member relative to the intermediate member in the direction of the rotational axis;
the intermediate member is coupled to the drive member via an elastic member, so that the rotational force of the drive member is transmitted to the intermediate member and the intermediate member is urged in the direction away from the electromagnetic solenoid;
the attraction force applied from the electromagnetic solenoid to the intermediate member while the auxiliary hole portion is located within the area of the main hole portion is set smaller than the urging force of the elastic member; and
the attraction force applied from the electromagnetic solenoid to the intermediate member while the auxiliary hole portion is located out of the area of the main hole portion is set greater than the urging force of the elastic member.

7. The electromagnetic clutch according to claim 1, wherein the drive member includes a drive arm; and
in this drive arm, there is formed a restricting means for maintaining the wrap spring under a set posture when the wrap spring is released from the pressure-contact relative to the tubular portion and detached from the outer circumference.

8. The electromagnetic clutch according to claim 7, wherein the drive arm extends in the direction of the rotational axis and to the outside of the wrap spring.

9. The electromagnetic clutch according to claim 7, wherein the drive arm includes a protruding piece protruding toward the wrap spring.

10. The electromagnetic clutch according to claim 9, wherein the protruding piece is provided on both sides of the wrap spring in the direction of the rotational axis.

11. The electromagnetic clutch according to claim 1, wherein the operational member includes a disc-like portion: and in an outer circumference of the disc-like portion, there is provided an engaging portion to which the other end of the wrap spring is coupled.

\* \* \* \* \*